UNITED STATES PATENT OFFICE.

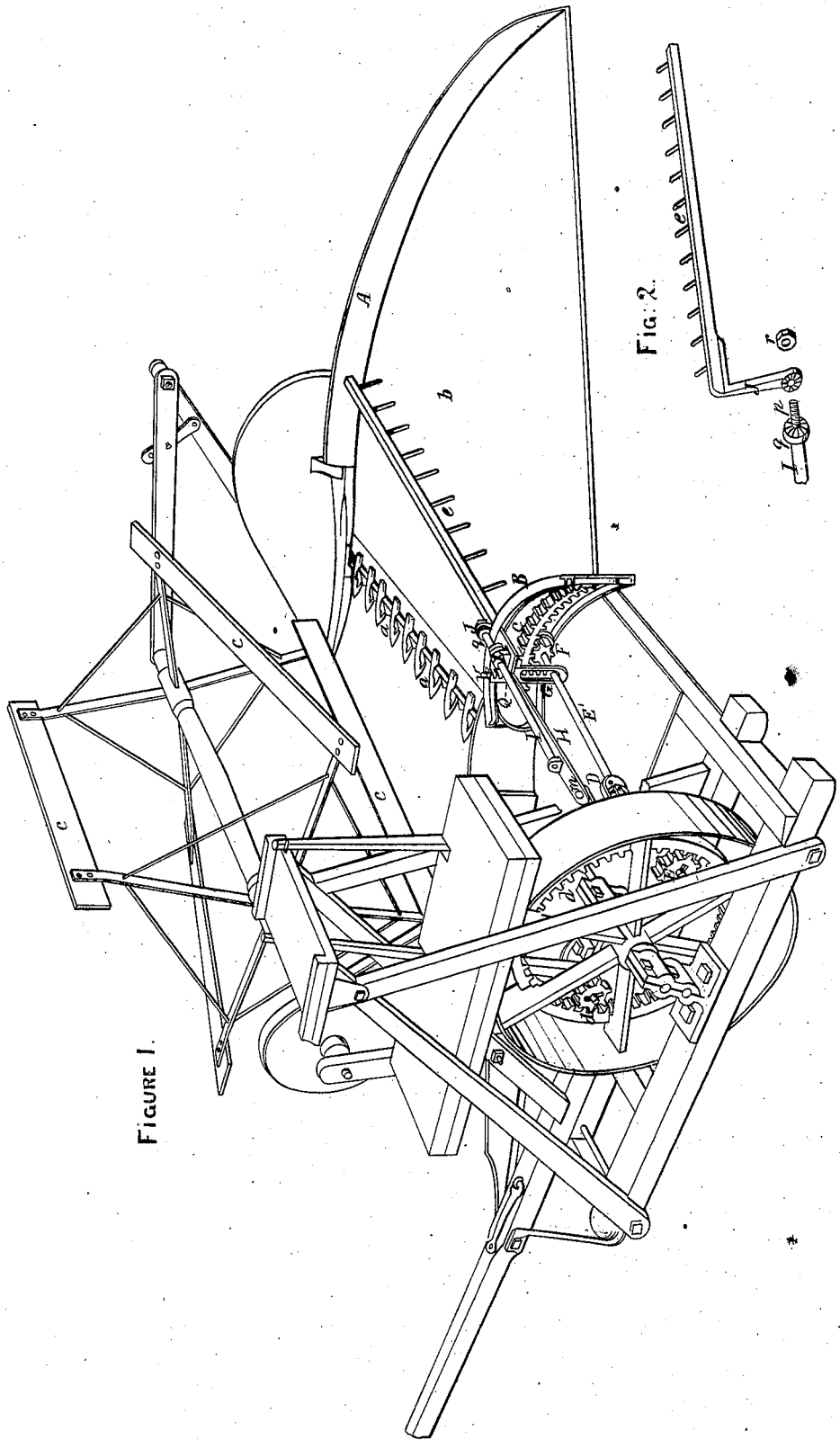

WILLIAM H. SEYMOUR, OF BROCKPORT, NEW YORK.

IMPROVEMENT IN HARVESTERS.

Specification forming part of Letters Patent No. 10,707, dated March 28, 1854.

*To all whom it may concern:*

Be it known that I, WILLIAM H. SEYMOUR, of Brockport, in the county of Monroe and State of New York, have invented certain new and useful Improvements in the Raking Mechanism of Harvesters for which Letters Patent of the United States were granted to me, bearing date the 8th day of July, 1851; and I do hereby declare the following to be a full, clear, and exact description of my said improvements, reference being had to the annexed drawings of a machine embracing the same, in which—

Figure 1 represents a perspective view of my machine, and Fig. 2 a view of the rake and part of the shaft which carries it, detached.

The cutter $a$, platform $b$, reel $c$, driving-gear $d$, rake $e$, and the general structure and arrangement of the frame of the machine, as represented, are substantially the same as the corresponding parts of the machine patented in 1851, and therefore I shall omit any detailed description of them, as unnecessary.

My improvements relate principally to the mechanism for traversing, raising, and lowering the rake and holding it firmly in either position. Instead of arranging this mechanism on the outer fence or rim, A, of the platform, I arrange it on the inner guard, B, where it is nearer the driving-gear, and therefore requires shorter and lighter shafts to operate it. This arrangement also admits of the turning mechanism being placed on the side of the fence outside of the platform, where it is not liable to come into contact with the straw and become entangled, as when arranged on the outer fence.

The mechanism for operating the rake consists of an endless rack, C′, arranged in a curve whose center coincides with the swiveling center of a universal joint, D, on the end of a counter-shaft, E, revolved by the main driving-wheel. This endless rack has a pinion, F, fitted to it, which is mounted on the outer end of a shaft, E′, whose inner end is connected to the universal joint D. The pinion is held in gear with the rack by means of a stirrup, G, in which the shaft can rise and fall a sufficient distance to permit the pinion to ascend to the upper and descend to the lower side of the rack. This stirrup depends from a vibrating arm or radius-bar, H, whose center, $m$, is immediately over the center of the universal joint, and whose outer end is supported by the rim-guard. This arm carries a shaft, I, which is supported in suitable bearings. On the outer end of this shaft an arm, J, is secured, which carries the rake $e$. By raising this arm the rake-teeth are raised up and held in a horizontal position, suitable for carrying them forward over the grain, and then by depressing the arm the teeth are brought down into a vertical position to engage with the stalks of grain to carry them off the platform. While the pinion F is on the upper side of the rack the rake-teeth are elevated and running forward, and while the pinion is on the under side of the rack the rake-teeth are depressed and running back. When the pinion descends from the upper to the lower part of the rack the rake-teeth are turned down, and when it ascends again the teeth are raised. The simple rotation of the shaft E causes the pinion to rotate, and its rotation, by reason of its teeth being engaged with those of the rack, causes it to run along the rack continuously, the shaft rising and falling as the pinion goes on to the upper and lower sides of the rack in succession. A rack, K, is mounted on the outer end of the shaft E′, between the stirrup G and the pinion, in such manner that it will be carried by but will not be turned with the shaft. The upper end of this rack passes through an opening, $o$, in the radius-arm, which serves to guide it. This rack is raised and lowered by the shaft E′ when the pinion F rises and falls. This rack gears into a toothed quadrant, L, on the shaft I, which carries the rake, so that as the rack rises the quadrant shall be turned upward and elevate the arm J and rake $e$, and as the rack descends it shall turn the quadrant down and depress the arm and rake. As the rack and quadrant are firmly geared together, the rake is held positively up or down, as the case may be. The arm J has an eye through its larger end, which fits upon the reduced portion $p$ of the outer extremity of the shaft I, the eye in the arm being round, and that part of the shaft on which it fits being of corresponding shape. The arm J can be turned at any angle to the platform $b$. When the arm is placed in the required position it is clamped against a shoulder, $q$, on the shaft by means of a nut, $r$, fitted to a screw on the extremity of the shaft, which protrudes through the eye of the arm. In this way the arm can be adjusted to any position that may be required to carry the rake at the distance above the platform at which it will work with the greatest efficiency. For example, if the arm be raised, the rake will be raised higher when the quadrant is turned up, but will not descend so low when the quadrant is reversed; but if the arm be adjusted lower, then the teeth of the rake will not be raised so high, but will descend lower. By this means the rake can be adjusted to the removal of the stalks in heavy or light crops and in large or small sheaves, as may be required.

It is obvious that a belt, band, or chain may be used as a substitute for the rack K and pinion L; or the rack might be a mere connecting-rod, and its upper end connected directly to an arm, instead of the quadrant on the shaft I, to raise and lower the rake. It is also obvious that the adjustment of the rake at various heights above the platform might be effected by making the quadrant adjustable, or an arm in place of the quadrant, or any part of the connection of the rake with the driving-gear that may be found most convenient in the various machines on which my improved rake may be used; and I wish it to be expressly understood that I reserve to myself the right to make alterations of the nature above suggested whenever I may find it expedient.

What I claim as my invention, and desire to secure by Letters Patent, is—

1. The combination of the shaft E′ for rotating the pinion, the shaft I for turning and carrying the rake, and connecting mechanism constructed and arranged as described, whereby the rake is turned up and down and firmly held in either position in a simple and convenient manner without producing an undue strain upon any part of the driving-gear.

2. The adjustment of the rake at varying heights from the platform, in its elevated and depressed positions, by means of the device herein described, or the equivalent thereof.

In testimony whereof I have hereunto subscribed my name.

WM. H. SEYMOUR.

Witnesses:
HENRY W. SEYMOUR,
JAMES ROBY.